United States Patent Office 2,899,509
Patented Aug. 11, 1959

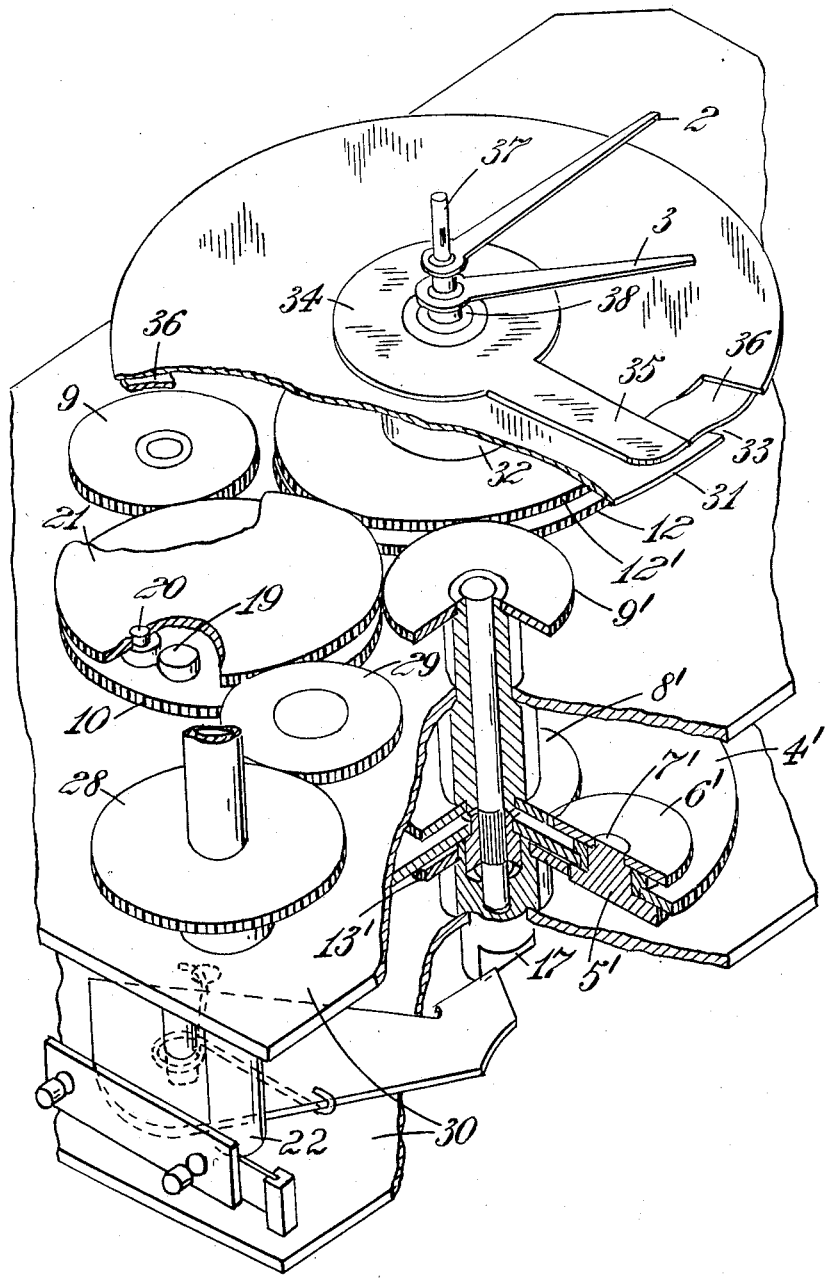

2,899,509

INDICATORS FOR INDICATING THE VALUES OF TWO VARIABLES AND A DIFFERENCE BETWEEN THOSE VALUES

Paul Flumm, London, England, assignor to S. Smith & Sons (England) Limited, London, England, a British company Application October 26, 1956, Serial No. 618,599

3 Claims. (Cl. 200—35)

This invention relates to indicators for indicating the values of two variables and the difference between these values and is particularly applicable to indicators for use with time switches associated with electric cooking ovens of the kind in which clock controlled mechanism is provided for switching on and off the electric supply at preselected times which mechanism embodies a first adjustable member which may be moved to a position corresponding to the selected time when the oven is being switched off and the second adjustable member movable to a position corresponding to the time when the oven is to be switched on which two members condition the switch mechanism to open and close at said predetermined times.

According to this invention an indicator for indicating the values of two variables and difference between these values comprises two indicating members rotatable relatively to one another and to a fixed scale, one of which indicating members comprises a disc or plate having an index mark or pointer which may traverse the scale and is provided with a slot or aperture therein disposed away from the axis of rotation and the other indicating member comprises a split annulus or part annular member one end of which is inserted through said slot or aperture so as to overlie the disc and is provided with an index mark or pointer which also traverses the scale, while the other end of the annulus is attached to or formed with an inwardly extending portion which is rotatable about the same axis about which the disc or like rotates and which annulus or part annulus is of a colour or shade contrasting with that of the disc and/or is provided with a scale. With this arrangement the values of the two variables can be read off the fixed scale while the difference between the two variables can be determined by the extent of annulus visible and/or by the scale on the annulus.

In applying the invention to a time controlled switch of the kind above referred both said scales may be graduated in hours and in minutes and the indicating members are connected respectively to the two adjustable members whereby the switch opens and closes at the required time.

In such an arrangement one of the two adjustable members is moved until one of the index marks or pointers is opposite the point on the scale corresponding to the time when the switch is to be opened and the other adjusting member is rotated until the scale on the annulus shows the required period of time during which cooking is to take place and its pointer will then show the time when the switch is to close.

Preferably the external diameter of the annulus and the diameter of the disc are the same.

The aforesaid slot in the disc is preferably a radially extending slot intersecting the circumference of the disc.

An outer disc may be provided having a slightly larger diameter than the internal diameter of the annulus so as to prevent the free end of the annulus from being displaced away from the first said disc.

In the case where the indicator is combined with the hour and minute hand of a clock having appropriate arbors, the arbors are arranged to extend through holes in the disc or discs and that part of the annulus which is rotatably mounted.

The following is a description of the invention as applied to a switch operating and setting mechanism for an electric cooker, reference being made to the accompanying drawing which is a diagrammatic perspective view of the device.

The switch mechanism is controlled by two cams one of which is indicated at 17. Each of the cams is driven by an output wheel of a differential gear mechanism one of which is indicated at 13'. Each of the differential gears has two input wheels, one set of input wheels being indicated at 4' and 9' and one of the wheels of the other set being indicated at 9. The wheel 4' and the corresponding wheel in the other set are driven by a clock. The wheels 9, 9' may be independently set by means of a setting spindle 22, through transmissions which in the case of the wheel 9' comprises meshing wheels 21, 29 and 28 which latter is fixed to a setting spindle 22. In the case of the wheel 9 the transmission comprises the wheel 10 which is driven through a lost motion connection 19, 20 from the wheel 21. The indicator according to the invention indicates the setting movement applied to the wheels 9 and thus to the cams. The wheels 10 and 21 engage respectively wheels 12 and 12'. The wheel 12' has secured to it a disc 31 by means of a hollow portion 32 and the edge of the disc has a radially extending slot 33 formed therein. Preferably the disc is black in colour. The wheel 12 has fixed to it a hollow boss which extends up through the hollow boss 32 and has secured at its outer end an annulus 34 from which extends a radial arm 35. The radial arm 35 has secured to it one end of a split annulus 36 part of which extends through the slot and lies above the black disc and the other part lies below the disc. The split annulus may be white or appropriately coloured to contrast with the black disc and its external diameter may be the same as that of the disc. Thus when there is relative rotation between the wheels 12, 12' a greater or lesser amount of the split annulus will be visible above the black disc.

The minute and hour hands 2, 3 are fixed respectively to arbors 37 and 38 the latter being tubular and these two arbors pass down through the hollow hub portions of the wheels 12 and 12' and are driven in conventional manner from the same transmission which drives the wheels 4, 4'. A fixed annular clock scale (not shown) may be arranged around the black disc which latter is provided with a pointer which traverses the scale. The split annulus 36 may also be marked in hours and minutes, a pointer being provided at the zero end of the scale. With this arrangement the setting spindle 22 is rotated in such a direction that the stop 20 transmits movement to the stop 19 whereby both the wheels 10 and 21 move together thus rotating the wheels 12, 12' and the black disc 31 and split annulus 36 will move together until the pointer on the black disc is opposite the fixed time scale corresponding to the time when the switch is to be opened. The setting spindle 22 is then rotated in the opposite direction bringing the stop 20 away from the stop 19 and this will result in the wheel 12 being rotated alone. A part of the split annulus will therefore be drawn through the slot over the black disc until the scale on the split annulus indicates the time duration during which cooking is to take place, and the pointer on this split annulus will indicate against the fixed time scale when the switch is to close.

I claim:
1. An indicator for indicating the closing and opening times of a clock driven electric switch comprising two adjustable rotatable switch control members controlling respectively the closing and opening of the switch, two differential gears each having an output member connected to one of the switch control members and two input members having gear wheels one driven by a gear wheel of the clock and the other by a setting gear wheel and which two setting gear wheels drive respectively two indicating members rotatable relatively to one another and to a fixed time scale, one of which indicating members comprises a plate having an index mark which may traverse the time scale and is provided with a cut away portion therein disposed away from the axis of rotation and the other indicating member comprises a flexible split annulus one end of which is inserted through said cut away portion so as to overlie the disc and is provided with an index mark which also traverses the time scale, while the other end of the annulus is attached to an inwardly extending portion which is rotatable about the same axis about which the plate rotates and which split annulus is arranged to be distinct from said plate.

2. An indicator according to claim 1 wherein said flexible spilt annulus is marked with a time scale.

3. An indicator according to claim 1 wherein a single setting member is provided and is geared directly to one of said indicating members and through a lost motion device with the other indicating member.

References Cited in the file of this patent

UNITED STATES PATENTS

| | | |
|---|---|---|
| 1,537,136 | Pierce | May 12, 1925 |
| 1,547,803 | Gavard | July 28, 1925 |
| 1,624,539 | Cremo et al. | Apr. 12, 1927 |
| 2,004,137 | Smith | June 11, 1935 |
| 2,032,774 | Smith | Mar. 3, 1936 |
| 2,825,401 | Kull | Mar. 4, 1958 |